United States Patent
Laracey

(10) Patent No.: US 10,387,862 B2
(45) Date of Patent: Aug. 20, 2019

(54) METHODS AND SYSTEMS FOR WALLET ENROLLMENT

(71) Applicant: PAYPAL, INC., San Jose, CA (US)

(72) Inventor: Kevin Laracey, Natick, MA (US)

(73) Assignee: PAYPAL, INC., San Jose, CA (US)

( * ) Notice: Subject to any disclaimer, the term of this patent is extended or adjusted under 35 U.S.C. 154(b) by 492 days.

(21) Appl. No.: 15/136,843

(22) Filed: Apr. 22, 2016

(65) Prior Publication Data
US 2016/0239818 A1 Aug. 18, 2016

Related U.S. Application Data

(63) Continuation of application No. 13/902,458, filed on May 24, 2013.

(60) Provisional application No. 61/651,193, filed on May 24, 2012.

(51) Int. Cl.
| | |
|---|---|
| *G06Q 20/20* | (2012.01) |
| *G06Q 20/36* | (2012.01) |
| *G06Q 30/06* | (2012.01) |
| *G06Q 20/40* | (2012.01) |
| *G06Q 20/32* | (2012.01) |
| *G06Q 20/10* | (2012.01) |
| *G06Q 20/34* | (2012.01) |

(52) U.S. Cl.
CPC ........... *G06Q 20/202* (2013.01); *G06Q 20/10* (2013.01); *G06Q 20/20* (2013.01); *G06Q 20/322* (2013.01); *G06Q 20/3278* (2013.01); *G06Q 20/3552* (2013.01); *G06Q 20/363* (2013.01); *G06Q 20/40* (2013.01); *G06Q 20/405* (2013.01); *G06Q 20/4014* (2013.01); *G06Q 30/06* (2013.01)

(58) Field of Classification Search
CPC ...... G06Q 30/06; G06Q 20/202; G06Q 20/20; G06Q 20/322; G06Q 20/3278; G06Q 20/40; G06Q 20/209; G06Q 20/3552; G06Q 20/363; G06Q 20/4014
USPC .......................................................... 705/21
See application file for complete search history.

(56) References Cited

U.S. PATENT DOCUMENTS

| | | | |
|---|---|---|---|
| 5,739,512 A | 4/1998 | Tognazzini | |
| 7,040,533 B1 | 5/2006 | Ramachandran | |
| 7,379,921 B1 | 5/2008 | Kiliccote | |
| 7,483,858 B2 | 1/2009 | Foran et al. | |
| 7,992,776 B1 | 8/2011 | Ramachandran et al. | |

(Continued)

FOREIGN PATENT DOCUMENTS

| | | |
|---|---|---|
| EP | 1 264 259 | 2/2007 |
| JP | 2000-217136 | 8/2000 |

(Continued)

OTHER PUBLICATIONS

Zheng, Pei; Ni, Lionel M. Smart Phone and Next Generation Mobile Computing. San Francisco: Elsevier Science & Technology, Jul. 19, 2010. Chapter 7.*

(Continued)

*Primary Examiner* — Nathan C Uber
*Assistant Examiner* — Fawaad Haider
(74) *Attorney, Agent, or Firm* — Haynes and Boone LLP

(57) ABSTRACT

Embodiments of the present invention relate to systems, methods, processes, computer program code, and means for creating digital wallets for users. In some embodiments, digital wallets are created, at least in part, on information obtained from payment transactions conducted by users.

20 Claims, 5 Drawing Sheets

(56) References Cited

U.S. PATENT DOCUMENTS

| | | |
|---|---|---|
| 2002/0026419 A1 | 2/2002 | Maritzen et al. |
| 2003/0004737 A1 | 1/2003 | Conquest et al. |
| 2003/0110717 A1 | 6/2003 | Rodriguez |
| 2005/0203854 A1 | 9/2005 | Das et al. |
| 2006/0105742 A1 | 5/2006 | Kim et al. |
| 2006/0206709 A1 | 9/2006 | Labrou et al. |
| 2007/0295805 A1 | 12/2007 | Ramachandran |
| 2008/0034221 A1 | 2/2008 | Hammad et al. |
| 2008/0048022 A1 | 2/2008 | Vawter |
| 2008/0222048 A1 | 9/2008 | Higgins et al. |
| 2009/0094134 A1 | 4/2009 | Toomer et al. |
| 2009/0254479 A1 | 10/2009 | Pharris |
| 2010/0017327 A1 | 1/2010 | Treadwell et al. |
| 2010/0125510 A1 | 5/2010 | Smith et al. |
| 2011/0055084 A1 | 3/2011 | Singh |
| 2011/0066550 A1 | 3/2011 | Shank et al. |
| 2011/0238573 A1 | 9/2011 | Varadarajan |
| 2011/0251892 A1 | 10/2011 | Laracey |
| 2012/0187187 A1 | 7/2012 | Duff et al. |
| 2013/0110654 A1 | 5/2013 | Kobres |
| 2013/0110676 A1 | 5/2013 | Kobres |
| 2013/0110727 A1 | 5/2013 | Kobres |
| 2013/0110728 A1 | 5/2013 | Kobres |
| 2013/0124411 A1 | 5/2013 | Kobres et al. |
| 2013/0132234 A1 | 5/2013 | Grossi et al. |
| 2013/0191227 A1 | 7/2013 | Pasa et al. |

FOREIGN PATENT DOCUMENTS

| | | |
|---|---|---|
| JP | 2002-032686 | 1/2002 |
| JP | 2002-109421 | 4/2002 |
| JP | 2003-141402 | 5/2003 |
| JP | 2004-246536 | 9/2004 |
| JP | 2004-326348 | 11/2004 |
| JP | 2005-157426 | 6/2005 |
| JP | 2005-276023 | 10/2005 |
| JP | 2006-099713 | 4/2006 |
| JP | 2006-243842 | 9/2006 |
| JP | 2006-277715 | 10/2006 |
| JP | 2007-034941 | 2/2007 |
| JP | 2007-299316 | 11/2007 |
| JP | 2008-129787 | 6/2008 |
| JP | 2008-217277 | 9/2008 |
| JP | 2008-242828 | 10/2008 |
| JP | 2009-080729 | 4/2009 |
| JP | 2009-276838 | 11/2009 |
| KR | 2006-0084520 | 7/2006 |
| KR | 1020100018744 | 2/2010 |
| KR | 201100039946 | 4/2011 |
| WO | WO 01/63546 | 8/2001 |
| WO | WO 2008-153096 | 12/2008 |
| WO | WO 2010/035224 | 4/2010 |
| WO | WO 2010/125577 | 11/2010 |

OTHER PUBLICATIONS

"Mobile payment", Wikipedia, Apr. 22, 2012, 7 pages [online], [retrieved on Jan. 10, 2018]. Retrieved from the Internet <URL:https://en.wikipedia.org/w/index.php?title=mobile_payment&olddid=488582651>.

"Point of sale", Wikipedia, May 23, 2012, 7 pages [online], [retrieved on Jan. 10, 2018]. Retrieved from the Internet <URL:https://en.wikipedia.org/w/index.php?title=Point_of_sale&oldid=493981241>.

"Payment terminal", Wikipedia, Apr. 5, 2012, 2 pages [online], [retrieved on Jan. 10, 2018]. Retrieved from the Internet <URL:https://en.wikipedia.org/w/index.php?title=Payment_terminal&oldid=485656256>.

"Square, Inc.", Wikipedia, Apr. 26, 2012, 5 pages [online], [retrieved on Jan. 10, 2018]. Retrieved from the internet <URL:https://en.wikipedia.org/w/index.php?title=Square,_Inc.&olddid=489355706>.

"Mobile Web", Wikipedia, May 22, 2012, 7 pages [online], [retrieved on Jan. 10, 2018]. Retrieved from the Internet <URL:https://en.wikipedia.org/w/index.php?title=Mobile_Web&olddid=493791415>.

Coskun et al., "Near Field Communication (NFC): From Theory to Practice", Feb. 13, 2012, 262 pages (Contents, Ch. 1-4, Ch. 6-8, Index), John Wiley & Sons Ltd., The Atrium, Southern Gate, Chichester, West Sussex, United Kingdom.

Williams, Damond, "Pro PayPal E-Commerce", Apress, Mar. 9, 2007, 306 pages, Springer-Verlag, New York, New York, USA.

Perez, Sarah, "Mobile Payments Startup Jumio Takes On Card.io With Credit Card Scanning Toolkit for App Developers", TechCrunch, May 16, 2012, 6 pages [online], [retrieved on Jan. 10, 2018]. Retrieved from the Internet <URL: https://techcrunch.com/2012/05/16/mobile-payments-startup-takes-on-card-io-with-credit-card-scanning-toolkit-for-app-developers/>.

Laracey, Kevin "Japanese Office Action", dated Jul. 29, 2014, for Japanese Patent Application No. 2013-546454, entitled: Mobile Phone ATM Processing Methods and Systems, 5pgs.

Laracey, Kevin "English-language Translation of Japanese Office Action", dated Jul. 29, 2014, for Japanese Patent Application No. 2013-546454, entitled: Mobile Phone ATM Processing Methods and Systems, 6pgs.

Communication: "The Extended European Search Report", dated Jun. 3, 2014, European Patent Office, for European Application No. 11851732.5-1958 12656292 PCT/US2011/067197, 6pgs.

"PCT Notification of Transmittal of the International Search Report and the Written Opinion of the International Searching Authority, or the Declaration", dated Dec. 7, 2011, for International Application No. PCT/ US2011/031696, 11pgs.

"PCT Notification of Transmittal of the International Search Report and the Written Opinion of the International Searching Authority, or the Declaration", dated Sep. 13, 2013, for International Application No. PCT/ US2013/042714, 10pgs.

"Japanese Office Action", dated Dec. 9, 2013, for Japanese Application No. 2013-503978, 8pgs.

"European Communication pursuant to Rule 114{2} EPC", European Patent Office, dated Oct. 30, 2013, European Application No. 11766781.6-1955 12556477, International Application No. PCT/US2011/031696, 8pgs.

New Releases in 2006, "Bill Paying by Mobile Phone Using Barcode Capture", Nov. 8, 2006, NIP Data Corporation, 4pgs.

"PCT Notification of Transmittal of the International Search Report and the Written Opinion of the International Searching Authority, or the Declaration", dated Sep. 13, 2013, for International Application No. PCT/ US2013/040953, 13pgs.

Laracey, Kevin "European Communication Extended European Search Report", European Patent Office, dated Mar. 27, 2014, for European Application No. 11766781.6-1955 f 2556477, International Application No. PCT/US2011/031696, 7pgs.

Laracey, Kevin "Notification Concerning Transmittal of International Preliminary Report on Patentability, Chapter I of the Patent Cooperation Treaty", dated Nov. 27, 2014, for International Application No. PCT/ US2013/040953, 10pgs.

Laracey, Kevin "Japanese Office Action", dated Aug. 21, 2014, for Japanese Patent Application No. 2013-503978, entitled: Mobile Phone Payment Processing Methods and Systems, 3pgs.

Laracey, Kevin "English-language Translation of Japanese Office Action", dated Aug. 21, 2014, for Japanese Patent Application No. 2013-503978, entitled: Mobile Phone Payment Processing Methods and Systems, 5pgs.

Laracey, Kevin "Notification Concerning Transmittal of International Preliminary Report on Patentability, Chapter I of the Patent Cooperation Treaty", dated Dec. 4, 2014, for International Application No. PCT/ US2013/042714, 7pgs.

Laracey, Kevin "Examiner's Report", dated Sep. 8, 2014, Canadian Intellectual Property Office, for Canadian Patent Application No. 2,819,696, entitled: Mobile Phone Payment Processing Methods and Systems, 4pgs.

"Notification of Transmittal of the International Search Report and the Written Opinion of the International Searching Authority or the

(56) References Cited

OTHER PUBLICATIONS

Declaration", dated Aug. 14, 2012, for PCT Application No. PCT/US2011/067197, 16pgs.

\* cited by examiner

METHODS AND SYSTEMS FOR WALLET ENROLLMENT

CROSS-REFERENCE TO RELATED APPLICATIONS

This application is a continuation of and claims priority to U.S. patent application Ser. No. 13/902,458 filed on May 24, 2013, which claims the benefit of U.S. Provisional Patent Application No. 61/651,193 filed on May 24, 2012, the entirety of which is incorporated herein by reference.

BACKGROUND

Consumers continue to seek faster, more convenient and more secure ways to pay for goods and services, pay bills, pay other people (peer-to-peer or person to person) and access cash at ATMs. In some cases this means conducting these transactions without the use of plastic payment cards. For example, the inventor of the instant application described systems and methods for using mobile devices (such as mobile phones) to conduct purchase transactions in U.S. Pat. No. 8,380,177, the contents of which are hereby incorporated herein in their entirety for all purposes.

Many card-less, online or mobile transaction systems require that users register one or more payment devices or accounts with a so-called "digital wallet". The digital wallet stores information about the user and the payment device(s), allowing the payment device(s) to be used in transactions involving the digital wallet. Unfortunately, adoption of such digital wallets requires that users enroll or otherwise provide information to the entity operating the digital wallet (including payment card details, user details, and the like). For example, some digital wallets require the user to navigate a Web browser to a wallet enrollment website, enter a portion of the data associated with a plastic payment card (or other payment account) into an enrollment form, and provide other authenticating information. This process can be time consuming, error prone, subject to fraud, and inconvenient for potential users.

As digital wallets become more prevalent, users will want to store many or all of their account information in the new wallet which makes the process even more time consuming. This difficult registration process makes it much less likely users will adopt alternate payment methods and creates a barrier to broader, merchant and financial institution acceptance.

It would be desirable to provide a convenient and secure way for users to register payment credentials with a digital or mobile wallet service and thus enable more rapid adoption of alternative payment methods.

DESCRIPTION

Figure 1:
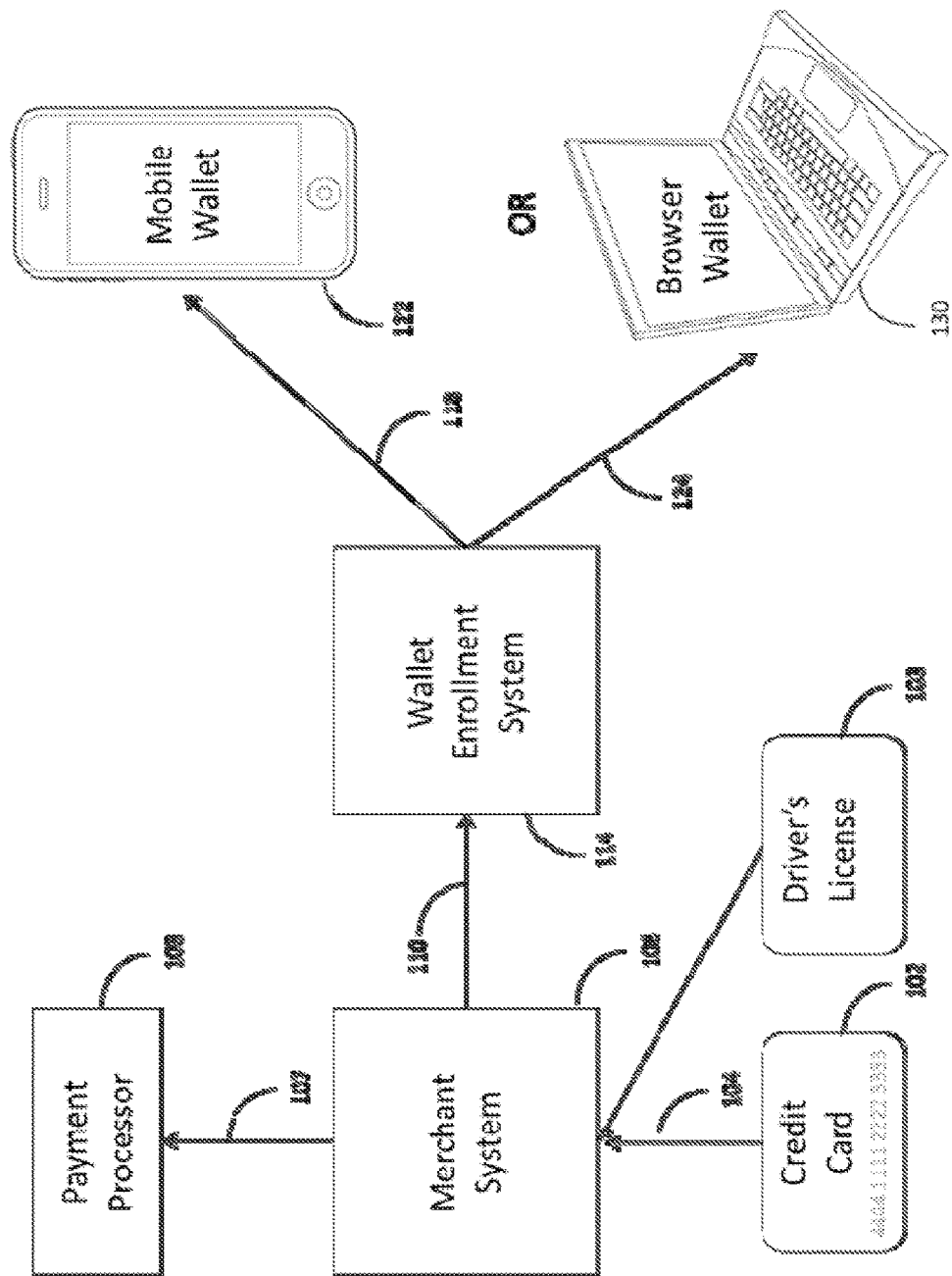
FIG. 1 is a block diagram depicting a system configured pursuant to some embodiments.

Embodiments of the present invention relate to systems, methods, processes, computer program code, and means for creating digital wallets for users. In some embodiments, digital wallets are created, at least in part, on information obtained from payment transactions conducted by users. For example, in some embodiments, a seed data record in a digital wallet system may be created for a user based on information obtained during a payment transaction conducted by that user. For example, the information may be obtained during a purchase transaction at a merchant in which the user presents a traditional credit card (or other payment device) to a merchant at a point of sale (in person at a physical point of sale or remotely in a mail order, telephone or Internet transaction). In some embodiments, payment details and user information obtained during the purchase transaction may be transmitted to a wallet enrollment system for use in creating a seed data record in a digital wallet system. Additional details may be provided by the user at a later time (e.g., in response to a notification message transmitted by the digital wallet system to the user). In this way, embodiments allow the creation of digital wallets on behalf of users efficiently and securely. Further, embodiments provide merchants and other entities with the ability to market and encourage use of digital wallets by prompting them to enroll while at a point of sale. In this way, merchants can dramatically accelerate consumer adoption of digital wallets.

As used herein, the term "payment device", "payment card" or "credit card" is used to refer to a device, card or indicator used to initiate payment or purchase transactions. For example, a payment device may be a traditional credit card, debit card, or similar device that may be presented to a merchant or other entity by an account holder to complete a financial transaction.

As used herein, the term "digital wallet" is used to refer to an electronic repository of payment or other account information such as, for example, a mobile payment application that accesses account information stored at one or more central repositories. For example, one form of digital wallet that may be used with desirable results in conjunction with embodiments of the present invention is the digital wallet (or mobile payment application) shown and described in our co-pending and commonly assigned U.S. patent application Ser. No. 13/768,156 and U.S. Pat. No. 8,380, 177, the contents of each of which are hereby incorporated by reference in their entirety for all purposes. Those skilled in the art, upon reading the following disclosure, will appreciate that embodiments of the present invention may be used with desirable results in conjunction with other "digital wallet" technologies such as, for example, electronic wallets accessible online (such as, for example, the Google® Wallet, PayPal®, V.ME from Visa® or the like). For example, a wallet accessible online (e.g., via a Web browser) may be referred to as a "browser wallet", while a wallet accessible through a mobile application may be referred to as a "mobile wallet". Some wallets may be accessible through both a mobile application as well as a browser. For convenience and ease of exposition, each of these wallets may be referred to herein as a "digital wallet".

Embodiments of the present invention relate to systems, methods, processes, computer program code and means for enrolling in and creating a digital/mobile wallet account that can be used on a mobile device or any other network (such as Internet) connected device to conduct financial transactions in a variety of contexts including retail stores, restaurants, ecommerce sites, bill payment, ATM cash access and between individuals. In some embodiments, the account and wallet creation process is initiated at a brick and mortar point-of-sale terminal, when a retailer processes a payment card as part of a traditional card-based payment transaction. In some embodiments, the card can include but is not limited to credit, debit, stored, value and even checking, savings and other bank accounts. In some embodiments, the card can be a loyalty, reward, or other benefits card.

For the purposes of describing features of some embodiments, an illustrative example will be described (and referenced throughout the remainder of this disclosure). This illustrative example is not intended to be limiting—instead, it is used to provide an example of some embodiments. In the illustrative example, an individual (the "customer") has several payment cards, including a debit card issued by a first bank (referred to as "First Bank") and a credit card issued by a second bank (referred to as "Second Bank"). Both of the payment cards are traditional form factor magnetic stripe cards (e.g., they are compliant with ISO Standards 7810, 7812 and 7813, for example). In the illustrative example, the customer is conducting a transaction at a retail store. In particular, the customer has presented a number of items to a store clerk, who has rung up the items on a store point of sale device. The customer chooses to pay using his debit card, and presents the card for payment (e.g., by swiping the magnetic stripe card through a customer-facing point of sale device, or by providing the card to the clerk, etc.).

Pursuant to embodiments of the present invention, several things occur at this point in the transaction. First, data from the payment card (e.g., such as magnetic stripe data read from Track 1 and/or Track 2 of the card) are used to establish a traditional payment authorization request (for submission to a payment network for processing of the transaction). Further, pursuant to some embodiments, the same (or similar) data from the payment card is used to establish a wallet registration request message. This wallet registration request message can be initiated by the point of sale terminal or it can be initiated elsewhere in the authorization processing network (e.g., such as at an acquirer, an issuer, a merchant processor, a gateway, or in the payment network itself). In some embodiments, generation (and transmission) of the wallet registration request message may require permission or acceptance by the customer. In some embodiments, this permission or acceptance is obtained at the point of sale (e.g., by presenting a message to the customer on a customer facing point of sale device, such as that shown and described below in conjunction with FIG. 5). In some embodiments, the customer permission or acceptance includes the receipt of a contact method for the customer, such as, for example, a mobile telephone number, an email address or the like.

Once acceptance or permission is obtained, the wallet registration request message is transmitted to a wallet enrollment system for further processing. In situations where the customer does not currently have a digital wallet, the wallet enrollment system provisions or creates a digital wallet on behalf of the customer. The provisioning of the digital wallet includes associating the received payment card data (e.g., from Track 1 and/or Track 2 of the payment card or the like) with the customer's digital wallet. In some embodiments the actual payment account information (such as the primary account number or "PAN" and other sensitive information) is stored in a secure manner and associated with the digital wallet using a proxy identifier or the like. Once the digital wallet is provisioned, information is transmitted from the wallet enrollment system (or from a system under control of the wallet enrollment system) to the customer (using the contact method provided by the customer) with instructions for accessing the newly provisioned digital wallet. In this manner, embodiments allow customers to easily register or associate payment card information with a wallet (as well as to create a new digital wallet). For example, in some embodiments, upon electronically or otherwise collecting (including by manual keypad entry) payment account information from a payment card, the account data is not only transmitted via traditional channels to a payment processor, but given customer approval, is also transmitted to a wallet enrollment system to initiate the account creation process.

In the illustrative example, the customer may later wish to add his credit card (from Second Bank) to his previously created digital wallet. Pursuant to some embodiments, additional payment cards can easily be added when the customer uses the additional payment card at a point of sale, and when prompted whether the card should be added to a digital wallet, the customer may consent and enter contact information that is previously associated with the existing digital wallet. The contact information may then be used to identify the existing digital wallet and information associated with the new payment card may be associated with the existing digital wallet of the customer.

In some embodiments, when a payment card is added (e.g., in response to a wallet registration request message) to a new (or existing) digital wallet, the payment card record in the wallet is considered to be a "seed" or partial record, and additional steps may be required from the customer to complete the information about the payment card in the wallet (e.g., to verify the customer's ownership of the account, to provide usage rules, to provide name, address and other contact information, or the like). In some embodiments, the contact method provided by the customer may be used to communicate information to the customer to obtain the additional information required to complete the record. As used herein, the term "seed record" will be used to refer to payment account data associated with a digital wallet which requires additional information from a holder of the payment account. While the term "record" is used, it is not intended to imply that a single record or field of a database or data table contains the information—instead, the term "record" is used merely for convenience and ease of exposition, and is intended to refer to any data storage technique in which data associated with an account may be stored in association with a digital wallet.

The initial account data including but not limited to customer name, account identification number, expiration date and other necessary information, is used to "seed" the account creation process. Once the initial account setup is completed, the wallet enrollment system sends an email, text message or otherwise notifies the user that an account has been created in their name. This notification includes a link, button or other means of navigating to an application or website for completing the enrollment process.

Once the customer installs the mobile application or navigates to a Web site associated with the wallet provider, they may or may not be required to enter additional information. At a minimum it is expected the customer will need to create account authentication credentials that may include but are not limited to a username, email address, password, PIN or other identifying information. This information will be used to authenticate further access to the digital wallet to change account information, user profile information or other user data. Those skilled in the art will appreciate there are a number of activities a user may wish to conduct as part of digital wallet account maintenance.

Once the registration process is complete, the customer now has a valid digital wallet that can be accessed by any number of alternative payment mechanisms or applications including mobile payment, ecommerce payments, peer-to-peer (or person to person) payments, bill payments and ATM cash access.

Embodiments of the present invention are believed to provide desirable advantages when compared to existing methods for user and payment account enrollment in alternative payment wallets. First, it provides a convenient process for retailers and other merchants to encourage registration for a digital wallet at the time of payment. In this way, consumers that are using traditional methods of payments can be encouraged to enroll for an alternative payment method as part of the normal payment process. This will create numerous opportunities to drive customer adoption as part of the normal daily business process.

Another advantage is customer convenience. Registering payment accounts can be a time consuming process whether it is entering credit card information, address data for an e-commerce site, or adding account information to an existing alternative payments platform like PayPal. It is widely believed that these existing registration processes are a primary deterrent to using alternative, digital or mobile payment systems. By reducing the enrollment and account creation process to a card swipe and a sharing of contact information (such as a mobile phone number or email address), the time required to register is dramatically reduced for the consumer.

Another advantage is the reduction of fraud in the digital wallet account creation process. Because physical payment cards are physically swiped at a point of sales system, fraud due to entering a stolen card number—a primary source of e-commerce fraud for example—is eliminated or substantially reduced. Only customers in physical possession of the card itself can initiate the enrollment process as part of a payment transaction. The payment transaction itself also helps reduce fraud in subsequent transactions since a successful payment transaction with no chargeback is a good indicator of valid credential data. Furthermore, the addition of the mobile number or email address adds another "factor" to the authentication process. This also reduces risk since it combines the physical card with an additional credential that can be further validated if necessary.

Features of some embodiments of the present invention will be described by reference to FIG. 1, which is a block diagram of a system 100 pursuant to some embodiments. As shown, the system 100 has a number of entities or devices which interact to facilitate the efficient enrollment in and provisioning of a digital wallet for a user. Further, the entities or devices of the system 100 may allow the efficient enrollment or registration of additional payment accounts or devices in existing digital wallets.

Figure 5:
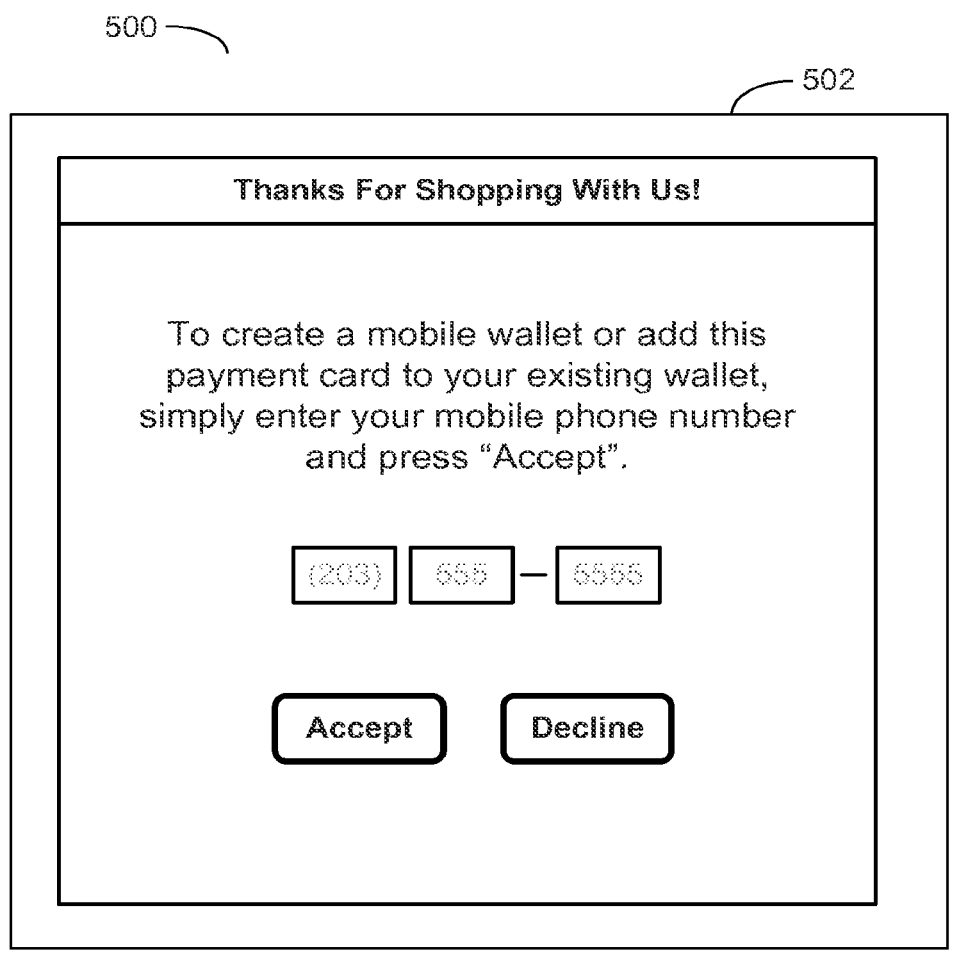
FIG. 5 is an illustrative user interface of a point of transaction display pursuant to some embodiments.

In the system of FIG. 1, a user paying for goods at a retail store approaches the cashier and begins to conduct a transaction in the traditional manner using a payment device 102. In some embodiments, the payment device could be a credit, debit, stored value or other type of payment card. The transaction may be conducted as a card present transaction (e.g., by swiping or presenting the payment card to a physical point of sale system) or it may be a card not present transaction (e.g., where the user enters card information into an electronic shopping cart or provides the card information over the phone). In some embodiments, such as for physical card present transactions, on presenting the card 104 at a point of sale of the merchant system 106, the clerk may be prompted on a display of a point of sale device of merchant system 106 to ask the user whether they would like to enroll information associated with the payment card 102 into a digital wallet and/or to create a new digital wallet. In other embodiments, the prompt to enroll the card may appear on a customer facing display of a point of sale device, or in an online shopping cart. The user may agree to enroll the payment card 102 in a digital wallet (and/or to create a new digital wallet with the payment card information) by either replying verbally to the clerk or selecting "yes" (or other affirmative choice) on a display and/or keypad of a point of sale device themselves. The clerk may also ask the user for their mobile phone number and/or email address to complete the transaction. In other embodiments, this request may appear on a customer facing display device (such as shown in FIG. 5) or in an electronic shopping cart, and the user may enter this information rather than a clerk. In other embodiments, the user may also be prompted to swipe their driver's license 103 or other identifying information in order to retrieve their home address information as well.

Once the user has accepted the offer to create or update a digital wallet using information associated with the payment card 102, the merchant system 106 generates and transmits a payment authorization request (including the data read from the payment card 102 as well as transaction details associated with the purchase transaction conducted between the cardholder and the merchant) to a payment processor 108 using a traditional processing network connection 107. For example, the merchant system 106 may post data to a payment gateway or otherwise transmit payment card and transaction data to a payment processor 108 for payment processing in a conventional manner.

Pursuant to embodiments of the present invention, the merchant system 106 also transmits (or causes the transmission of) payment card information and cardholder contact information (such as a mobile phone number, an email address, or the like) to a wallet enrollment system 114 over a network connection 110. For example, the payment card and contact information may be formed in a wallet request message and transmitted to the wallet enrollment system 114 via a secure API or the like. In some embodiments, the wallet request message is generated by an entity other than the merchant system 106. For example, in some embodiments, the merchant system 106 may flag those transactions in which a cardholder has opted in to allowing the payment card to be used in a wallet registration process pursuant to the present invention. The flag may be set in one or more fields such that a payment processor 108 associated with the merchant system 106 may identify those transactions in which the cardholder has opted in to permitting use of the payment card to be used in an wallet registration process, and then the payment processor 108 may generate a wallet request message which is transmitted to wallet enrollment system 114 for enrollment processing. In some embodiments, both a flag (or other data element) indicating customer consent as well as data identifying a customer contact method may be provided. For example, the customer contact method may include information identifying a preferred method by which the customer wishes to be contacted once the digital wallet has been provisioned by wallet enrollment system 114 (e.g., such as a mobile phone number, an email address, or the like).

That is, in some embodiments, the merchant systems 106 transmits the wallet request message to the wallet enrollment system 114, and in some embodiments, the payment processor 108 transmits the wallet request message to the wallet enrollment system 114. In either embodiment, the wallet request message may include information from the payment card 102 used in a transaction at the merchant (e.g., such as Track 1/Track 2 data read from a magnetic stripe, or the like).

The wallet enrollment system 114 combines the payment card data which may include (but is not limited to): a payment card number (also referred to as a "PAN"), a payment card expiration date, and a customer name. Customer contact information may also be provided (if captured by the merchant systems as described herein), such as, for example, a mobile phone number, an email address, or the like. In some embodiments, if a driver's license was successfully scanned by the merchant system 106, the data transmitted to the wallet enrollment system 114 data may also include the cardholder's home address and other information. If the customer did not previously have a digital wallet provisioned, this data (received by the wallet enrollment system 114 from a wallet request message or messages) is used to create a new "seed" digital wallet account in the customer's name with the swiped payment card as the initial payment instrument in the digital wallet. If the customer did previously have a digital wallet provisioned, this information from the wallet request message is used by the wallet enrollment system 114 to update an existing digital wallet of the customer (by adding the new payment card to the existing digital wallet of the customer).

Pursuant to some embodiments, the provisioning of a new digital wallet may include the storage of the received payment card information in a secure storage device or network, and generating an identifier (or "proxy") which allows the digital wallet to reference the payment card information in the secure storage device or network. The proxy may further be associated with a wallet identifier assigned to the new customer. In this manner, a digital wallet may be created that is seeded with basic information associated with the customer, including the customer contact information (such as mobile phone number) and a proxy or identifier usable to lookup or retrieve the payment card information.

Subsequent to creating the seed digital wallet account, the wallet enrollment system 114 may send a notification message to the user (using the contact preference information provided by the user). For example, the system 114 may cause a text message 118 to be sent to the user's mobile device 122 with a link to install a mobile wallet application. The user will select this link and install the mobile application in order to complete the registration process. In other embodiments, the wallet enrollment system may use an email message 124 to send to prompt users of a mobile phone or a personal computer 130 to complete their registration and/or install the mobile application.

Once the mobile application is installed, the user will be asked to enter any remaining necessary account information needed to complete the configuration and setup of the digital wallet. For example, the user may be prompted to enter their home address, their billing address, their preferred shipping address, and other contact information (such as alternative phone numbers and email address). Other required information may include additional account credentials, social security number, password selection, password hints and other information. Those skilled in the art will appreciate that other pieces of information may be collected pursuant to the present invention.

Once the registration process is complete, the user is now able to use their digital wallet using their mobile or internet connected device to purchase goods or services, pay bills or access cash at ATMs. The digital wallet is presented on the mobile or other Internet connected device as a series of accounts available for payment. After the goods and/or services have been totaled, the payment method is selected and the transaction conducted.

Although a single wallet enrollment system 114 is shown in FIG. 1, any number of such devices may be included. Moreover, various devices described herein might be combined according to embodiments of the present invention. For example, in some embodiments, the wallet enrollment system, the payment processor, and the merchant (or combinations thereof) might be co-located and/or may comprise a single apparatus. The wallet enrollment system 114 may be implemented as one or more server or other computing devices which include one or more computer processors which may include one or more conventional microprocessors and may operate to execute programmed instructions to provide functionality as described herein. The wallet enrollment system 114 may be, according to some embodiments, accessible via a Graphical User Interface (GUI) rendered at least in part by one or more input/output controllers. The GUI might be used, for example, to allow access to wallet information or the like by one or more users and/or administrators.

Figure 2:
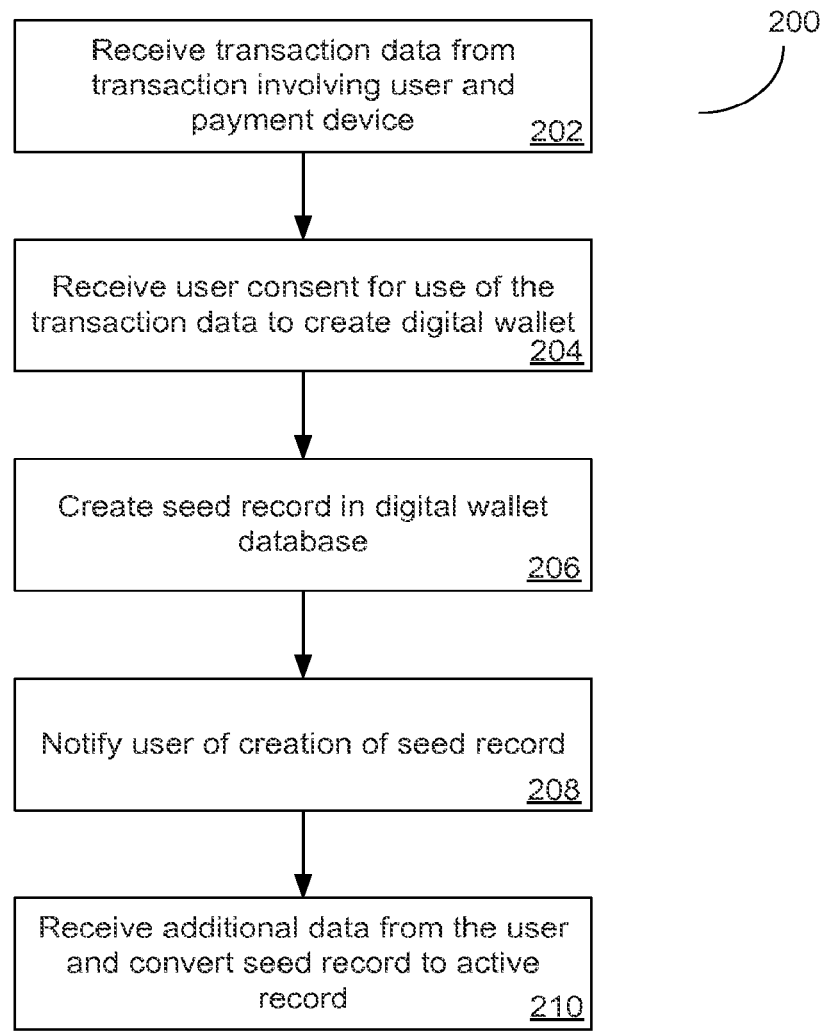
FIG. 2 is a flow diagram depicting a process pursuant to some embodiments.

Reference is now made to FIG. 2, where a process 200 for creating a wallet account pursuant to some embodiments is described. Process 200 may be performed by a system such as the system 100 of FIG. 1. For example, process 200 may be performed in association with a purchase transaction conducted by a customer of a merchant system 106. Although embodiments are described as being performed in conjunction with a purchase transaction, embodiments may also be used in a registration process, where a customer swipes or presents a payment device in order to create a "seed" record in a digital wallet, without conducting a payment transaction.

Processing begins at 202 where a wallet enrollment system 114 (or other device operated to perform the processing of FIG. 2) receives transaction data from a payment transaction involving a user and a payment device. For example, the transaction data may be received from a merchant point of sale location at which a user has presented a payment device for a purchase transaction. The transaction processing at the merchant may proceed as a normal transaction; however, some or all of the transaction data may be transmitted (in parallel, in real time, or in a batch mode) to the wallet enrollment system 114 at 202, including, for example, data from Track 1 and/or Track 2 of a magnetic stripe of the payment device, as well as information identifying the user. For example, processing at 202 may include transmitting or preparing to transmit the following information to the wallet enrollment system: the user's name, the primary account number ("PAN") of the payment device, and an expiry date. In some embodiments, the user may be prompted to provide additional information such as an email address, a phone number, or the like.

In some embodiments, at 204, either before or after a payment device is presented, the user is prompted (e.g., prior to or in conjunction with the purchase transaction) to consent to transmitting some or all of the information to the wallet server (e.g., by being prompted by a clerk at the merchant location, or by accepting terms and conditions on a display screen associated with the point of sale device, or the like). For example, an illustrative user interface 500 for prompting for such information is shown in FIG. 5 (where a user interface 500 that may be displayed on a display device 502 at a point of transaction is shown).

At 206, the wallet enrollment system 114 receives the information and creates a seed record in a wallet database on behalf of the user. As used herein, the term "seed record" generally refers to a partial record that either requires additional information to be a complete record for use (e.g., such as additional user information or additional payment account information) or that requires verification or confirmation by the user. In some embodiments, a seed record may be created for an existing user, where the seed record may be associated with an existing digital wallet associated with a current user, and the seed record includes payment account information for a new payment account to be associated with the user. For example, a user who has already established an existing digital wallet with payment account details for a Visa® credit card, and who is conducting a purchase transaction using a MasterCard® debit card may have details of the MasterCard debit card added as a seed record associated with his existing digital wallet account. In this manner, embodiments allow users to easily, securely and accurately add payment account details to their digital wallet.

Processing continues at 208 where the user is notified of the creation of the seed record. For example, this notification may be transmitted to the user as an email message, as a text message, as a phone call or the like, prompting the user to verify details in the seed record and to add any additional data needed to convert the seed record to an active record. This notification may be used as a security mechanism to ensure that the user authorized the creation of the seed record, to verify details, and/or to collect additional information. The notification may provide the user with instructions to verify/add details, such as a URL the user needs to visit, a phone number to call, or the like.

Processing continues at 210 where additional data and/or verification details are received from the user, and the seed record is converted to an active record in the wallet enrollment system 114. In some embodiments, the additional data obtained at 210 may include information identifying a mobile wallet payment application. For example, in some embodiments, an application may be downloaded onto a user's mobile device which allows the user to conduct transactions using the digital wallet. Processing at 210 may include associating information with the specific application (including information identifying the mobile device on which the application has been installed) with the payment information from the seed record.

Figure 3:
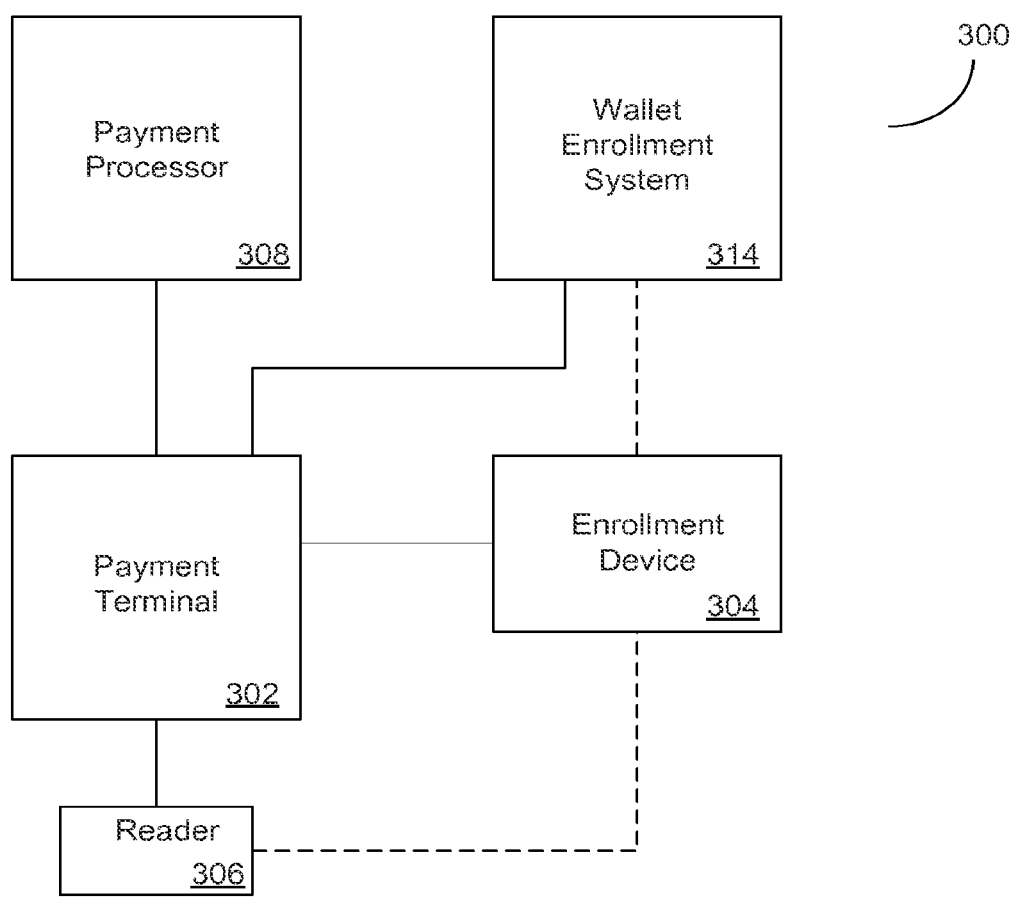
FIG. 3 is a block diagram depicting a point of transaction device pursuant to some embodiments.

Pursuant to some embodiments, wallet enrollment may be performed using a separate hardware device configured to allow wallet enrollments to be performed at merchant or other transaction locations that have legacy payment terminals (e.g., such as point of sale devices which have not been adapted to perform wallet enrollment as described herein). Referring now to FIG. 3, such a wallet enrollment system 300 is shown.

The wallet enrollment system 300 may include one or more components that are deployed at a merchant location or at other locations where consumers are located and wish to enroll to participate in a digital wallet program. For example, a wallet enrollment system 300 may include an enrollment device 304 which is located at customer service counters at merchant locations, at bank branches, at events, or the like. Pursuant to some embodiments, a wallet enrollment system 300 may include a legacy payment terminal 302 (such as a electronic cash register, a point of sale terminal or the like). Pursuant to some embodiments, the wallet enrollment system 300 leverages the processor and communications of the legacy payment terminal 302. An enrollment device 304 is in communication with the legacy payment terminal 302. The enrollment device 304 may be, for example, a computing device with a touch screen display interface, such as a tablet computing device (e.g., such as an Apple® iPad, or a device using the Android® or Microsoft® Windows operating systems). In some embodiments, the enrollment device 304 may have a keypad or other data entry device (in addition to or instead of a touch screen).

In some embodiments, the enrollment device 304 (and/or the payment terminal 302) is in communication with a card reader 306. The card reader 306 may be, for example, a magnetic stripe reader. The card reader 306 may be built into a housing of the enrollment device 304 or be a separate component in communication with the enrollment device 304. For example, the card reader 306 may be coupled to a universal serial bus ("USB") port of the enrollment device 304 and may be configured to read up to 3 tracks of data from magnetic stripe payment devices pursuant to ANSI/ISO Standards 7810,7811-1/6 and 7813.

The card reader 306 may also be or include a radio frequency identifier ("RFID") reader, such as one configured to interrogate and read data from a contactless mobile device such as one configured to operate pursuant to the PayPass® standard or the like. In some embodiments, the card reader 306 is shared by the payment terminal 302 and the enrollment device 304. In some embodiments, a separate card reader 306 may be provided for use with the enrollment device 304.

The enrollment device 304, may be operated in conjunction with the payment terminal 302 and the reader 306 to perform wallet enrollment processing (e.g., as described above in conjunction with FIG. 1). For example, the enrollment device 304 may be used to secure consumer consent to allow payment card data to be transmitted to a wallet enrollment system 314 for use in creation or updating of a digital wallet. In some embodiments, the enrollment device 304 may be operated separately from the payment terminal 302 to allow a user to register payment account information for use in creating or updating a digital wallet separate from a payment transaction. For example, a user may interact with the enrollment device 304 to swipe or present a payment card solely for the purpose of creating or updating a digital wallet with information from that payment card (in which case the enrollment device 304 may communicate the wallet enrollment request message directly to a wallet enrollment system 314 or have the wallet enrollment request message forwarded or routed to the wallet enrollment system 314 through the payment terminal 302).

Not all of the components shown in FIG. 3 need be involved in a wallet enrollment system 300 of the present invention. For example, in some embodiments, an enrollment device 304 may be in communication with a reader 306 to allow a user to create or update digital wallets pursuant to the present invention. For example, in some embodiments, enrollment device 304 may be a standalone device in communication with a reader 306 and wallet enrollment system 314 to allow users to swipe or otherwise read their card(s) and cause the information read from the card(s) to be transmitted (along with customer contact information and opt in data) to wallet enrollment system 314. As an illustrative example, an enrollment device 304 may be a tablet computer, a mobile device, a kiosk, a dedicated terminal, or the like located at a customer service desk or other convenient location for customers to interact with the enrollment device 304 to present their payment cards for reading to create or update digital wallets pursuant to the present invention.

As a further illustrated example, in some embodiments, the wallet enrollment device 304 may be a mobile device (including a mobile device operated by the user wishing to create or update a digital wallet). In such an embodiment, a mobile wallet registration application may be made available and downloaded and installed onto a mobile device.

The mobile device, operating the mobile wallet registration application, may function as an enrollment device 304. In some embodiments, the reader 306 may be a mobile magnetic stripe reader that attaches to a mobile device via a Micro-USB port or an audio jack of the mobile device. For example, one suitable reader is an iMag Pro Mobile MagStripe Reader available from ID TECH® (or similar devices). In such an embodiment, a user of a mobile device that is configured with a mobile wallet registration application, and which is in communication with a payment card reader (including magnetic stripe or other reader technologies), may read payment card information from one or more payment cards and cause the information read from the cards to be transmitted to a wallet enrollment system 314 to update or create a digital wallet pursuant to the present invention. As another illustrative example, in some embodiments, no reader 306 is required. Instead, imaging and capture technology available on a mobile device may be used to capture an image of the face of a payment card. The captured image may then be processed using image processing software and tools (such as those provided by Card.io®) to generate payment card data (including, for example, the cardholder's name, the PAN, the expiration date, and card image). This captured data may be transmitted (along with cardholder contact information) from the mobile device (acting as an enrollment device 304) to wallet enrollment system 314 to cause the updating or creation of a digital wallet pursuant to the present invention.

The wallet enrollment system 300 may be configured with software to allow consumers to perform wallet enrollment processing. For example, the system 300 may be configured to perform a wallet enrollment process as described in FIG. 4, in which a process 400 for wallet enrollment is shown.

Process 400 begins at 402 when a consumer interacts with an enrollment device 304 to request a mobile wallet. For example, a consumer may visit a location having an enrollment device 304 and interact with a display menu on the device. For example, a display screen of the enrollment device 304 may prompt the consumer to "click here to get your mobile wallet" or a similar call to action. An illustrative user interface 500 is shown in FIG. 5, where a user interface 500 that may be displayed on a display screen 502 of an enrollment device 304 is shown. As depicted in FIG. 5, the user interface 500 prompts the user "To create a mobile wallet or add this payment card to your existing wallet, simply enter your mobile phone number and press 'Accept'". Those skilled in the art will appreciate that this prompt is illustrative, and that other user interfaces may be utilized. Further, while a mobile phone number may be used as a customer contact method, other contact methods may also be used.

Processing continues at 404 where the wallet enrollment system 300 receives consumer contact information. More particularly, in some embodiments, the consumer is prompted (e.g., by interacting with the display device associated with the enrollment device 304) to enter the phone number of their mobile device on which they wish to install and use the mobile wallet application. Once the phone number is received, processing continues at 406 where the consumer is prompted to present a first payment card to be read by the card reader 306. The consumer then swipes or taps (depending on whether the card is a magnetic stripe card or an RFID card) a first payment card on reader 306. The card data is transmitted from the enrollment device 304 to a remote wallet enrollment platform for processing. The card data (such as, for example, Track 1 and Track 2 data from a magnetic stripe payment card) are read by the reader 306, passed to the enrollment device 304 for association with the information entered by the consumer (e.g., the mobile phone number entered by the consumer), and transmitted to the remote wallet enrollment platform so that the data may be used to store the card data in the consumer's mobile wallet.

If the card is read properly and the card data is successfully captured, processing continues at 408 where the consumer is prompted to answer whether they wish to add another payment card to their wallet. If "yes", processing reverts to 406 and the consumer is prompted to present another card to the reader 306. If no further cards are to be added to the consumer's wallet, processing continues at 410 where a mobile wallet installation message is transmitted to the consumer.

For example, the mobile wallet installation message may be transmitted to the consumer as an email message (if the consumer provided their email address), as an SMS message, or the like. The mobile wallet installation message may provide a link directing the consumer to download and install the mobile wallet application of the present invention on their mobile device. In some embodiments, the mobile wallet is pre-loaded with information about the consumer's enrolled payment cards.

In some embodiments, the mobile wallet installation message may be presented to the consumer on the display device of the enrollment device 304. For example, a QR code may be generated which encodes a URL to a download location for the mobile wallet application (which may be personalized for the consumer). The consumer may be prompted to operate their mobile device and scan the QR code to initiate download and installation of the mobile wallet application.

When the mobile wallet application is downloaded onto the consumer's mobile device, an installer may launch the application and prompt the consumer for information to complete the enrollment process. For example, the consumer may be prompted to validate themselves. As one specific validation example, a consumer may be presented with several addresses that may be associated with their payment card(s) (several of which are invalid) and prompted to select their correct address. If the consumer properly identifies their correct address, the consumer is validated and the mobile wallet application installation process may complete and the mobile wallet may be used for use in payment transactions.

Figure 4:
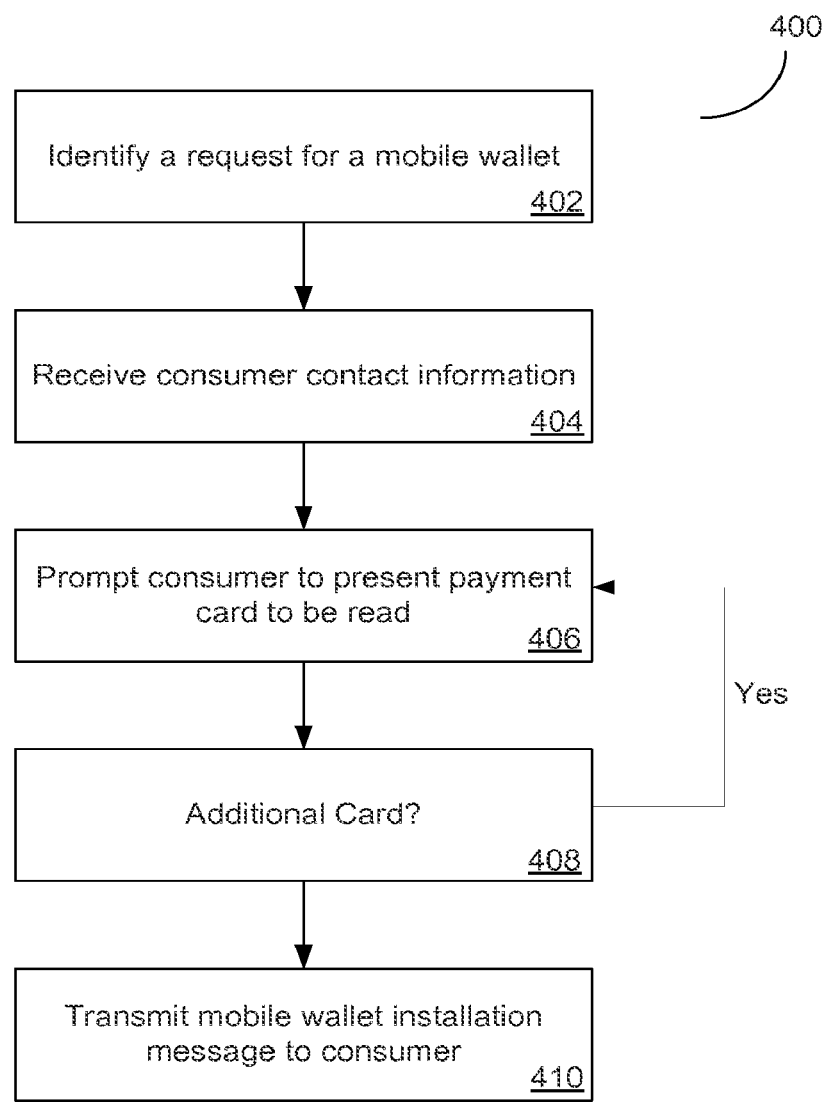
FIG. 4 is a flow diagram depicting a process pursuant to some embodiments.

Embodiments of the present invention as shown and described in conjunction with FIGS. 3-5 provide an upgrade path for merchants that do not have point of sale terminals that are capable of being updated with wallet enrollment software or applications.

The above descriptions of processes herein should not be considered to imply a fixed order for performing the process steps. Rather, the process steps may be performed in any order that is practicable, including simultaneous performance of at least some steps.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

The invention claimed is:

1. A digital wallet enrollment system comprising:
 a non-transitory memory; and
 one or more hardware processors coupled to the nontransitory memory and configured to read instructions from the non-transitory memory to cause the system to perform operations comprising:
receiving, from a point of sale device via a secure application programming interface (API), a wallet request message associated with a transaction, wherein the wallet request message comprises contact information for a user and a captured image of a payment instrument of the user;
processing the captured image to determine user payment account data associated with the payment instrument;
creating a digital wallet seed record from, at least, the user payment account data, wherein the digital wallet seed record comprises information associated with at least one of a user name, an account identification number of the payment instrument, or an expiration date of the payment instrument, and wherein the digital wallet seed record is configured to enable a digital wallet to be created in response to receiving a conversion indication;
transmitting information associated with the digital wallet seed record to the user using the contact information
receiving the conversion indication;
storing the information associated with the user payment account data in a secure data store identifiable by a proxy identifier; and
creating, based on the receiving the conversion indication, the digital wallet comprising the proxy identifier, wherein the digital wallet is configured to utilize the proxy identifier to retrieve the user payment account data.

2. The digital wallet enrollment system of claim 1, wherein the user payment account data is associated with at least one of a credit card, a debit card, a stored value card, a payment card, or a contactless payment instrument and the captured image is obtained during the transaction at the point of sale device.

3. The digital wallet enrollment system of claim 1, wherein the operations further comprise:
creating the digital wallet from the digital wallet seed record upon receipt of the conversion indication.

4. The digital wallet enrollment system of claim 1, wherein the captured image comprises at least one of: (i) a logo of an issuer of the payment instrument, (ii) a logo of a payment network of the payment instrument, or (iii) an image of a payment card graphic.

5. The digital wallet enrollment system of claim 1, wherein the contact information is obtained at an enrollment device in communication with the point of sale device.

6. The digital wallet enrollment system of claim 1, wherein the user payment account data comprises at least one of a user name, an account identification number, or an expiration date.

7. The digital wallet enrollment system of claim 1, wherein the operations further comprise:
provisioning a mobile wallet application for use by the user, wherein the mobile wallet application comprises the user payment account data.

8. The digital wallet enrollment system of claim 7, wherein the operations further comprise:
transmitting, to a user mobile device, information usable by the user mobile device to install the mobile wallet application;
receiving, from the user mobile device, identifying data directed towards the user mobile device on which the mobile wallet application is installed; and
associating the user payment account data with the user mobile device.

9. The digital wallet enrollment system of claim 1, wherein the operations further comprise:
receiving additional information to update the digital wallet.

10. The digital wallet enrollment system of claim 1, wherein operations further comprise:
receiving user verification information,
wherein the digital wallet is created from the digital wallet seed record based further on the receiving the user verification information.

11. A method of conducting a digital wallet registration comprising:
receiving a wallet request message associated with a transaction flagged for a wallet registration by a point of sale device, wherein the wallet request message comprises contact information for a user and a captured image of a payment instrument of the user obtained from the point of sale device;
determining user payment account data associated with the payment instrument from the captured image;
creating a digital wallet seed record from, at least, the user payment account data, wherein the digital wallet seed record comprises information associated with at least one of a user name, an account identification number, or an expiration date of the payment instrument, and wherein the digital wallet seed record is configured to enable a digital wallet to be created in response to receiving a conversion indication;
transmitting information associated with the digital wallet seed record to the user using the user contact information;
receiving the conversion indication;
storing the information associated with the user payment account data in a secure data store identifiable by a proxy identifier; and
creating, based on the receiving the conversion indication, the digital wallet comprising the proxy identifier, wherein the digital wallet is configured to utilize the proxy identifier to retrieve the user payment account data.

12. The method of claim 11, wherein the payment instrument comprises at least one of a credit card, a debit card, a stored value card, a payment card, or a contactless payment instrument and the captured image is obtained during the transaction at the point of sale device.

13. The method of claim 11, further comprising:
receiving a user consent to utilize the information associated with the payment instrument to create the digital wallet seed record.

14. The method of claim 13, wherein the user contact information and the user consent are received in a single message.

15. The method of claim 11, wherein the user contact information is a mobile telephone number, and wherein the transmitting information associated with the digital wallet to the user further comprises at least one of (i) transmitting a text message to the user, or (ii) placing a phone call to the user.

16. The method of claim 11, wherein the information associated with the digital wallet transmitted to the user comprises a Uniform Resource Locator or a phone number.

17. The method of claim 11, further comprising routing the user payment account data to an issuer of a payment account for authorization of the transaction.

18. The method of claim 11, wherein the conversion indication is received from an electronic device associated with the user.

19. A non-transitory machine-readable medium having stored thereon machine-readable instructions executable to cause a machine to perform operations comprising:

receiving a wallet request message associated with a transaction flagged for a wallet registration by a point of sale device, wherein the wallet request message comprises contact information for a user and a captured image of a payment instrument of the user obtained from the point of sale device;

determining user payment account data associated with the payment instrument from the captured image;

creating a digital wallet seed record from, at least, the user payment account data, wherein the digital wallet seed record comprises information associated with at least one of a user name, an account identification number, or an expiration date of the payment instrument, and wherein the digital wallet seed record is configured to enable a digital wallet to be created in response to receiving a conversion indication;

transmitting information associated with the digital wallet seed record to the user using the user contact information;

receiving the conversion indication;

storing the information associated with the user payment account data in a secure data store identifiable by a proxy identifier; and creating, based on the receiving the conversion indication, the digital wallet comprising the proxy identifier, wherein the digital wallet is configured to utilize the proxy identifier to retrieve the user payment account data.

20. The non-transitory machine-readable medium of claim 19, wherein the payment instrument comprises at least one of a credit card, a debit card, a stored value card, a payment card, or a contactless payment instrument and the captured image is obtained during the transaction at the point of sale device, and wherein the captured image comprises at least one of: (i) a logo of an issuer of the payment instrument, (ii) a logo of a payment network of the payment instrument, or (iii) an image of a payment card graphic.

* * * * *

UNITED STATES PATENT AND TRADEMARK OFFICE
CERTIFICATE OF CORRECTION

PATENT NO. : 10,387,862 B2
APPLICATION NO. : 15/136843
DATED : August 20, 2019
INVENTOR(S) : Kevin Laracey Page 1 of 1

It is certified that error appears in the above-identified patent and that said Letters Patent is hereby corrected as shown below:

In the Specification

In Column 11, Line 21, change "(such as those provided by Card.io®) to generate" to --(such as those provided by card.io®) to generate--

In the Claims

In Column 14, Line 64, change "Uniform Resource Locator or a phone number" to --Uniform Resource Locator and/or a phone number--

Signed and Sealed this
Fifteenth Day of October, 2019

Andrei Iancu
*Director of the United States Patent and Trademark Office*